United States Patent [19]

Franklin

[11] 3,884,573

[45] May 20, 1975

[54] APPARATUS FOR HIGH RESOLUTION PROJECTION PRINTING

[75] Inventor: David M. Franklin, Lexington, Mass.

[73] Assignee: The Computervision Corporation, Bedford, Mass.

[22] Filed: Jan. 29, 1974

[21] Appl. No.: 437,746

[52] U.S. Cl. .................... 355/51; 354/121; 355/52; 355/71

[51] Int. Cl. .......................................... G03b 27/50

[58] Field of Search .......... 354/121; 355/71, 52, 50, 355/51, 31

[56] References Cited

UNITED STATES PATENTS

| | | | |
|---|---|---|---|
| 2,830,491 | 4/1958 | Domeshek | 355/52 X |
| 2,882,792 | 4/1959 | Levine | 355/71 X |
| 3,427,105 | 2/1969 | Ingalls | 355/50 X |
| 3,655,260 | 4/1972 | Bartucci et al. | 355/52 X |
| 3,687,545 | 8/1972 | Moorhusen | 355/51 X |

*Primary Examiner*—Richard A. Wintercorn
*Attorney, Agent, or Firm*—Richard J. Birch

[57] ABSTRACT

A apparatus for high resolution projection printing utilizing a projection printer having a 1:1 object-to-image ratio and forming an erect image. In the preferred embodiment, coplanar master plates and unexposed plates are rotated together in synchronization in the same direction about a common axis of rotation. An optical scanning-projection printing system is moved in a radial direction with respect to the rotational axis of the master and unexposed plates to provide a spiral scan of the image bearing master plates and a corresponding 1:1 spiral printing scan of the unexposed plates. Scanning exposure compensation is achieved by means of a sinusoidal or diamond shaped diaphragm which is positioned in the illumination path and imaged onto the master plates.

7 Claims, 5 Drawing Figures

APPARATUS FOR HIGH RESOLUTION PROJECTION PRINTING

BACKGROUND OF THE INVENTION

The present invention relates to projection printers in general and, more particularly, to a high resolution projection printer having a 1:1 object-to-image ratio and forming an erect image.

Projection printers for projecting the image of a master plate upon an unexposed plate are well known in the semiconductor manufacturing art. The optical systems required for projecting an image of a four inch master plate with sufficient resolution are extremely complicated and expensive.

It is, accordingly, a general object of the invention to provide an apparatus for high resolution projection printing which utilizes a relatively simple and inexpensive combination of optical and mechanical systems to achieve the desired high resolution image projection.

It is a specific object of the invention to provide a high resolution projection printer which produces an erect, unity image of an object.

It is another object of the invention to provide a high resolution projection printer which utilizes conventional optical elements.

It is a feature of the invention that the optical system of the invention permits the master and unexposed plates to be scanned in the same direction without requiring complicated mechanical movements.

It is still another feature of the invention that the master and unexposed plates can be rotated in the same direction about a common axis of rotation.

A further feature of the invention is that it permits scanning of a larger master plate than is possible with existing equipment.

These objects and features of the invention and other objects and features thereof will best be understood from a detailed description of a preferred embodiment of the invention, selected for purposes of illustration and shown in the accompanying drawings in which.

Figure 2:
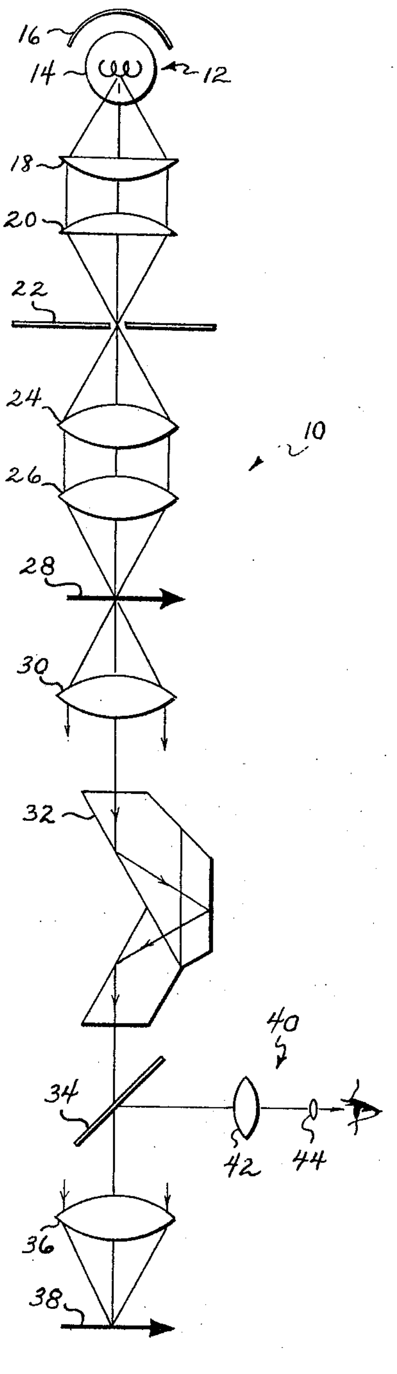
FIG. 2 is a diagrammatic illustration of the optical system of the present invention.
Figure 1:
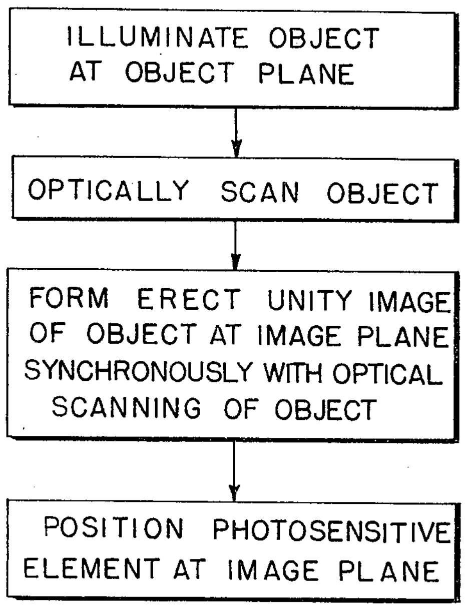
FIG. 1 is a block flow diagram illustrating the method of the present invention.

Turning now to the drawins and particularly to FIGS. 1 and 2 thereof, there are shown respectively, a flow diagram of the generalized method steps of the present invention and a diagramatic view of the optical system of the present invention. It will be helpful to briefly examine the generalized steps of the method of the present invention before discussing the specific structural elements of the invention.

The present invention relates to an apparatus for high resolution projection printing. Typically, the invention can be used to produce a high resolution photographic image of an image bearing master plate. The practice of the invention is achieved in the following manner: an object is positioned at an object plane and illuminated by a suitable source of illumination. The illuminated object is then optically scanned in a conventional manner e.g. spirally or by a raster scan. An optical system is employed to form an erect, unity image of the illuminated object at an image plane in synchronization with the optical scanning of the illuminated object. As used herein the term "unity" image means that the object-to-object ratio is 1:1. An unexposed photosensitive element is positioned at the image plane so that the unexposed element is sequentially exposed in synchronization with the optical scanning of the illuminated object.

Looking at FIG. 2, there is shown in diagramatic form and indicated generally by the reference numeral 10 an optical system constructed in accordance with the present invention. The optical system 10 comprises: a light source 12 which includes a bulb 14 and reflector 16; a pair of condenser lenses 18 and 20; a diaphragm 22; another pair of condenser lenses 24 and 26; an object 28 positioned at an object plane and indicated diagramatically by an "arrow"; a first movable objective lens 30; a prism system 32 which provides complete image reversal; an optional beam splitter 34; a second movable objective lens 36; and, the resulting erect, unity image 38 positioned at an image plane. Preferably, beam splitter 34 is employed in conjunction with a viewing and focusing telescope indicated generally by the reference numeral 40 and comprising convex lenses 42 and 44. A variety of prism systems 32 can be employed to achieve the complete image reversal in order to provide a resulting erect image 38. In the preferred embodiment, the prism 32 comprises an Abbe (or Konig or Brashear-Hastings) prism. The Abbe prism provides an image without displacing the axis of the optical system. However, it will be appreciated that other prism systems such as Porro prisms can be employed. In this case, the axis of the erect, unity image 38 is shifted laterally with respect to the axis of the object 28.

Figure 3:
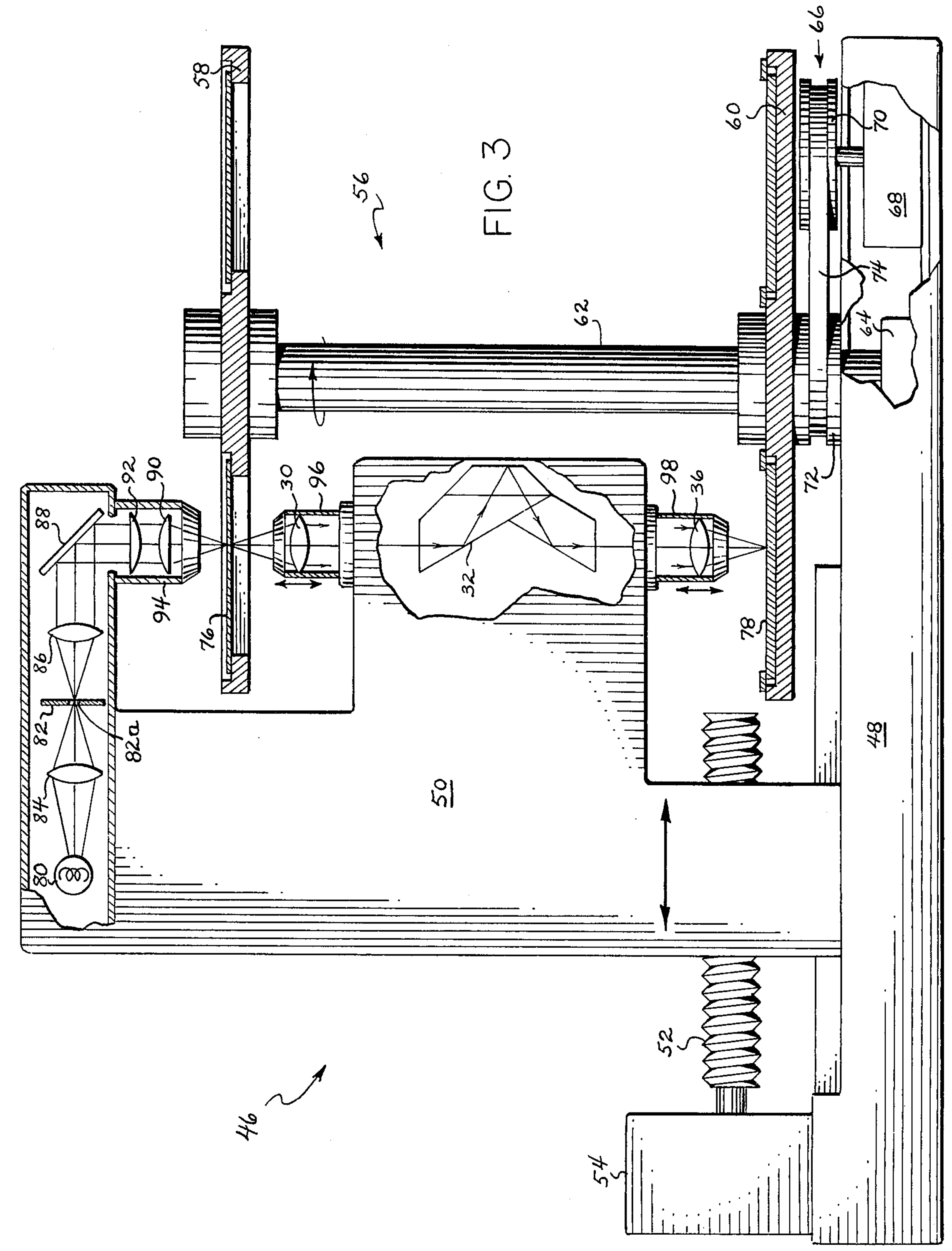
FIG. 3 is a partially diagrammatic side elevation of a preferred embodiment of the invention with portions thereof broken away for purposes of clarity; and, FIGS. 4A and 4B are plan views of two diaphragm configurations for the projection printer embodiment depicted in FIG. 3.

The diagramatic optical system shown in FIG. 2 can be implemented in a projection printer in a variety of ways. FIG. 3 illustrates in side elevation and partially broken away a projection printer 46 constructed in accordance with the present invention. The projection printer 46 has a base 48 upon which is movably mounted an optical system housing 50. Movement of the optical system housing 50 is accomplished by means of a lead screw 52 which is driven by motor 54. The bi-directional rotation of motor 54 causes the optical system housing 50 to move to the left or right as shown in FIG. 3.

A master plate-unexposed photosensitive plate positioning system indicated generally by the reference numeral 56 is also mounted on the projection printer base 48. The plate positioning system 56 comprises a rotatable master plate holder 58 and an unexposed plate holder 60 which are secured to a rotatable shaft 62 which is rotatably mounted in a bearing assembly 64. Rotational power for rotating the master and unexposed plate holders 58 and 60 respectively, is obtained through a drive belt system indicated generally by the reference numeral 66 and comprising motor 68, motor pulley 70, shaft pulley 72, and drive belt 74.

One or more image bearing master plates 76 are held within the master plate positioner 58 and a corresponding plurality of unexposed photosensitive plates 78 are held within the unexposed plate positioner 60. It can be seen from FIG. 3 that the master plate positioner 58 and the unexposed plate positioner 60 are secured to the rotational shafts 62 in coplanar, superposed relation so that the corresponding master and unexposed plates are also held in coplanar superposed relation. Thus when shaft 62 is rotated, the master and unexposed plates rotate together in the same direction in synchronization about the common rotational axis defined by the axis of shaft 62.

The optical system shown in FIG. 3 differs slightly from that shown diagramatically in FIG. 2 because of the mechanical structure of the preferred embodiment of the projection printer. However, it should be understood that the same inventive concept of the present invention is utilized in the embodiment shown in FIG. 3. A light source 80 illuminates a diaphragm 82 through lens 84. The light exiting from the diaphragm aperature 82*a* is directed through lens 86 to mirror 88 which changes the beam direction from a horizontal position to a downward position as viewed in FIG. 3. A pair of condensing lenses 90 and 92 are mounted in a mount 94. The condensing lenses image the diaphragm aperature 82*a* onto the master plate 76. A movable focusing mount 96 is positioned beneath the master plate 76 and contains the previously mentioned first objective lens 30. Directly beneath the objective lens 30 is the image reversing prism system 32. The second objective lens 36 is mounted in another movable focusing housing 98. Preferably, the first and second objective lenses 30 and 36 are a pair of matched infinity corrected objectives. The second objective 36 projects a one-to-one i.e. unity image of the illuminated area of the master plate 76 upon the unexposed, photosensitive plate 78.

It will be appreciated from the geometry of the various elements of the projection printer, that the master plate 76 will be scanned in a spiral manner when the master plate or plates are rotated about the axis of shaft 62 and the optical housing 50 is moved in a radial direction with respect to the rotational axis as shaft 62 by means of the motor driven lead screw 52. Although other scanning patterns, such as a raster scan, can be employed in practicing the invention, the preferred embodiment utilizes a spiral scan. In order to provide exposure compensation in the spiral scanning mode shown in FIG. 3, the relationship between the radial movement of the optical housing 50 and the rotational movement of the master and unexposed plate positioners 58 and 60 is coordinated to provide overlapping scans on the master plate 76 with a concomitant overlapping printing or imaging on the unexposed plate 78. The actual exposure compenation is provided by the specific configuration of the diaphragm aperature 82*a*.

Figure 4A:
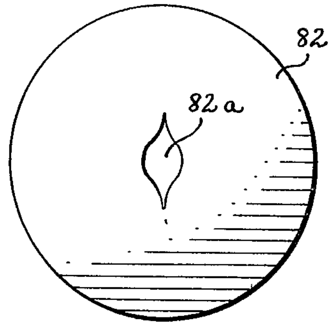
Figure 4B:
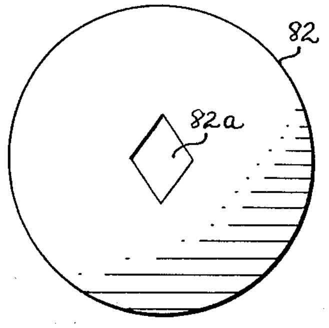

Looking at FIG. 4 two suitable diaphragm aperature configurations are illustrated. In FIG. 4A the diaphragm aperature 82*a* has a sinusoidal configuration while in FIG. 4B the aperature has a diamond shaped configuration. It will be appreciated that given an overlapping scan between successive scanning paths, two sweeps of the sinusoidal aperature shown in FIG. 4A will fit together to provide a uniform energy distribution or exposure for any given element of the unexposed plate. A similar analysis also obtains with regard to the diamond shaped configuration shown in FIG. 4B.

Having described in detail a preferred embodiment of my invention it will now be apparent to those skilled in the art that numerous modifications can be made therein without departing from the scope of the invention as defined in the appended claims.

What I claim and desire to secure by Letters Patent of the United States is:

1. A high resolution projection printer comprising:

1. means for positioning a light transmitting planar object at an object plane;
2. means for illuminating a light transmitting planar object positioned at said object plane;
3. means for optically scanning an illuminated light transmitting planar object positioned at said object plane;
4. optical means for forming at an image plane, an erect, unity image of an illuminated light transmitting planar object positioned at the object plane in synchronization with the optical scanning of the illuminated object, said optical means including first and scond matched, infinity corrected objectives and an image erecting prism means positioned optically between said objectives; and,
5. means for positioning an unexposed, planar photosensitive element at the image plane whereby the photosensitive element is sequentially exposed in synchronization with the optical scanning of the illuminated object.

2. The apparatus of claim 1 wherein said object and unexposed photosensitive element positioning means are adapted for rotation about a common axis of rotation and wherein said aparatus includes drive means for rotating said object and element positioning means together in synchronization in the same direction about said common axis of rotation.

3. The apparatus of claim 2 wherein said object and unexposed photosensitive element positioning means comprise turntables which are mounted on a common, rotatable axle with said drive means rotating the axle whereby the turntables are rotated together in synchronization in the same direction about the common axis.

4. The apparatus of claim 2 wherein said optical scanning means scans the object in a spiral direction.

5. The apparatus of claim 4 wherein said spiral scans partially overlap and further including means for providing exposure compensation for the corresponding overlapped images on the unexposed photosensitive element.

6. The apparatus of claim 1 wherein said matched infinity objectives are movably mounted to permit individual focusing of each objective.

7. The apparatus of claim 1 wherein said image erecting prism means is an Abbe prism.

* * * * *